(12) United States Patent
Boinais et al.

(10) Patent No.: US 12,263,812 B2
(45) Date of Patent: Apr. 1, 2025

(54) STORAGE COMPARTMENT FOR A PASSENGER CABIN OF A VEHICLE

(71) Applicant: Faurecia Interior Systems, Inc., Auburn Hills, MI (US)

(72) Inventors: Olivier Boinais, West Bloomfield, MI (US); Aurelien Francois, Berkley, MI (US); Sven Christopherson, West Bloomfield, MI (US); Benjamin Louis, Bloomfield Hills, MI (US); Thibaud Delcourt, Royal Oak, MI (US); Eddy Musuvaho, Royal Oak, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 555 days.

(21) Appl. No.: 17/552,484

(22) Filed: Dec. 16, 2021

(65) Prior Publication Data

US 2023/0192002 A1    Jun. 22, 2023

(51) Int. Cl.
*B60R 7/04*    (2006.01)

(52) U.S. Cl.
CPC ..................... *B60R 7/04* (2013.01)

(58) Field of Classification Search
CPC .................... B60R 7/04; B60N 3/08
USPC ............................ 296/37.8, 24, 34
See application file for complete search history.

(56) References Cited

U.S. PATENT DOCUMENTS

| | | | |
|---|---|---|---|
| 6,435,587 B1* | 8/2002 | Flowerday | B60N 3/08 220/345.5 |
| 6,715,815 B2* | 4/2004 | Toppani | B60R 7/06 296/37.12 |
| 7,347,471 B2* | 3/2008 | Whitens | B60N 2/793 296/37.8 |
| 7,770,954 B2* | 8/2010 | D'Alessandro | B60R 7/04 296/37.8 |
| 8,444,196 B2* | 5/2013 | Arndt | B60R 7/04 296/187.05 |
| 9,156,407 B1* | 10/2015 | Kramer | B60R 7/04 |
| 9,868,401 B2* | 1/2018 | Kodama | B60R 7/04 |

(Continued)

FOREIGN PATENT DOCUMENTS

| | | |
|---|---|---|
| DE | 102009030350 A1 | 12/2010 |
| DE | 102015113395 A1 | 2/2017 |

(Continued)

OTHER PUBLICATIONS

Extended European Search Report corresponding to application 22213967.7, dated May 15, 2023, 11 pages.

*Primary Examiner* — Pinel E Romain

(74) *Attorney, Agent, or Firm* — Reising Ethington P.C.

(57) ABSTRACT

A storage compartment for a passenger cabin of a vehicle can provide a large opening and increased accessibility, while maintaining a large working surface. The storage compartment comprises a plurality of walls forming an interior storage area, the plurality of walls including an exterior comprising at least a first panel and a second panel. The first panel has an access end and the second panel has an access end. The access end of the first panel and the access end of the second panel are configured to create a working surface on the exterior when in a closed position. In an open position, the first panel or the second panel is configured to allow access to the interior storage area from two or more different sides of the exterior.

16 Claims, 5 Drawing Sheets

(56) References Cited

U.S. PATENT DOCUMENTS

| | | | | |
|---|---|---|---|---|
| 9,878,671 | B2* | 1/2018 | Murray | B60R 7/04 |
| 10,377,317 | B2* | 8/2019 | Ranganathan | B60N 2/793 |
| 2002/0089203 | A1* | 7/2002 | Flowerday | B60N 3/08 |
| | | | | 296/37.8 |
| 2008/0129071 | A1* | 6/2008 | Hipshier | B60R 7/04 |
| | | | | 296/1.08 |
| 2012/0074726 | A1 | 3/2012 | Takai | |
| 2013/0187400 | A1* | 7/2013 | D.Alessandro | B60R 7/04 |
| | | | | 29/428 |
| 2018/0118121 | A1 | 5/2018 | Gorman, Jr. | |
| 2018/0222394 | A1 | 8/2018 | Huebner et al. | |
| 2019/0193651 | A1 | 6/2019 | Salewski | |

FOREIGN PATENT DOCUMENTS

| | | | | |
|---|---|---|---|---|
| DE | 102017112518 | A1 | 12/2018 | |
| EP | 3495210 | B1 * | 10/2020 | B60N 3/10 |

\* cited by examiner

STORAGE COMPARTMENT FOR A PASSENGER CABIN OF A VEHICLE

TECHNICAL FIELD

The present disclosure is related generally to vehicle interiors and, more particularly, to storage compartments for passenger cabins of vehicles.

BACKGROUND

Storage compartments, such as those having tambour doors, have been used in various vehicle interior designs. However, they typically do not provide a sufficiently sized working space (e.g., a generally flat area for a laptop or the like), and they are often only accessible via one side of the storage compartment. For example, US Patent Application Publication 2018/0222394 to Huebner et al. shows a dual tambour door design that has a working space on the top of the center console. However, access to the storage area is only permitted on one side. This can limit the type and amount of goods stored in the storage compartment, and may also hinder access to the storage compartment.

SUMMARY

An illustrative storage compartment comprises a plurality of walls forming an interior storage area, the plurality of walls including an exterior comprising at least a first panel and a second panel. The first panel has an access end and the second panel has an access end. The access end of the first panel and the access end of the second panel are configured to create a working surface on the exterior when in a closed position. In an open position, the first panel or the second panel is configured to allow access to the interior storage area from two or more different sides of the exterior.

In various embodiments, the first panel is a first tambour door and the second panel is a second tambour door.

In various embodiments, the two or more different sides join at a rounded radius.

In various embodiments, the two or more different sides includes a first side and a second side, with the first side configured to face a roof of the vehicle, and the second side configured to face a door of the vehicle.

In various embodiments, the two or more different sides includes a third side, with the third side configured to face another door of the vehicle.

In various embodiments, the first panel is configured to allow access to the interior storage area from the first side and the second side, and the second panel is configured to allow access to the interior storage area from the first side and the third side.

In various embodiments, the first panel and the second panel are configured to be placed between a center console and an instrument panel of the vehicle, whereby one of the plurality of walls is formed by, or located at, the center console and another of the plurality of walls is formed by, or located at, instrument panel.

In various embodiments, there is a first reinforcement strap and a second reinforcement strap, and the first reinforcement strap and the second reinforcement strap delimit a first side of the two or more different sides.

In various embodiments, the first reinforcement strap and the second reinforcement strap extend between a center console and an instrument panel of the vehicle.

In various embodiments, the first panel and the second panel are configured to slide under the first reinforcement strap and the second reinforcement strap, respectively, such that the first reinforcement strap and the second reinforcement strap are visible in the passenger cabin when in the closed position.

In various embodiments, the first panel and the second panel each have a recessed handle located toward the access end.

In various embodiments, the first panel has a recessed end opposite the access end and the second panel has a recessed end opposite the access end.

In various embodiments, the recessed end of the first panel is configured to overlap the recessed end of the second panel when in the open position.

In various embodiments, the recessed end of the first panel and the recessed end of the second panel are configured to overlap in a door space beneath an interior storage bin when in the open position.

In various embodiments, the interior storage bin has a sidewall that partially extends up two of the two or more different sides that each face a different door of the vehicle.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described herein is a storage compartment that provides increased usability when in a closed position, and increased storage capacity and accessibility, particularly when in an open position. The storage compartment combines bomb bay style doors with jalousie or tambour style doors to more efficiently use space within a passenger cabin of a vehicle. In an advantageous embodiment, each of the doors allows access to an interior storage area via two different sides of the storage compartment. This can provide for more convenient use of the storage compartment, while maintaining a streamlined and integrated vehicle interior appearance.

Figure 1:
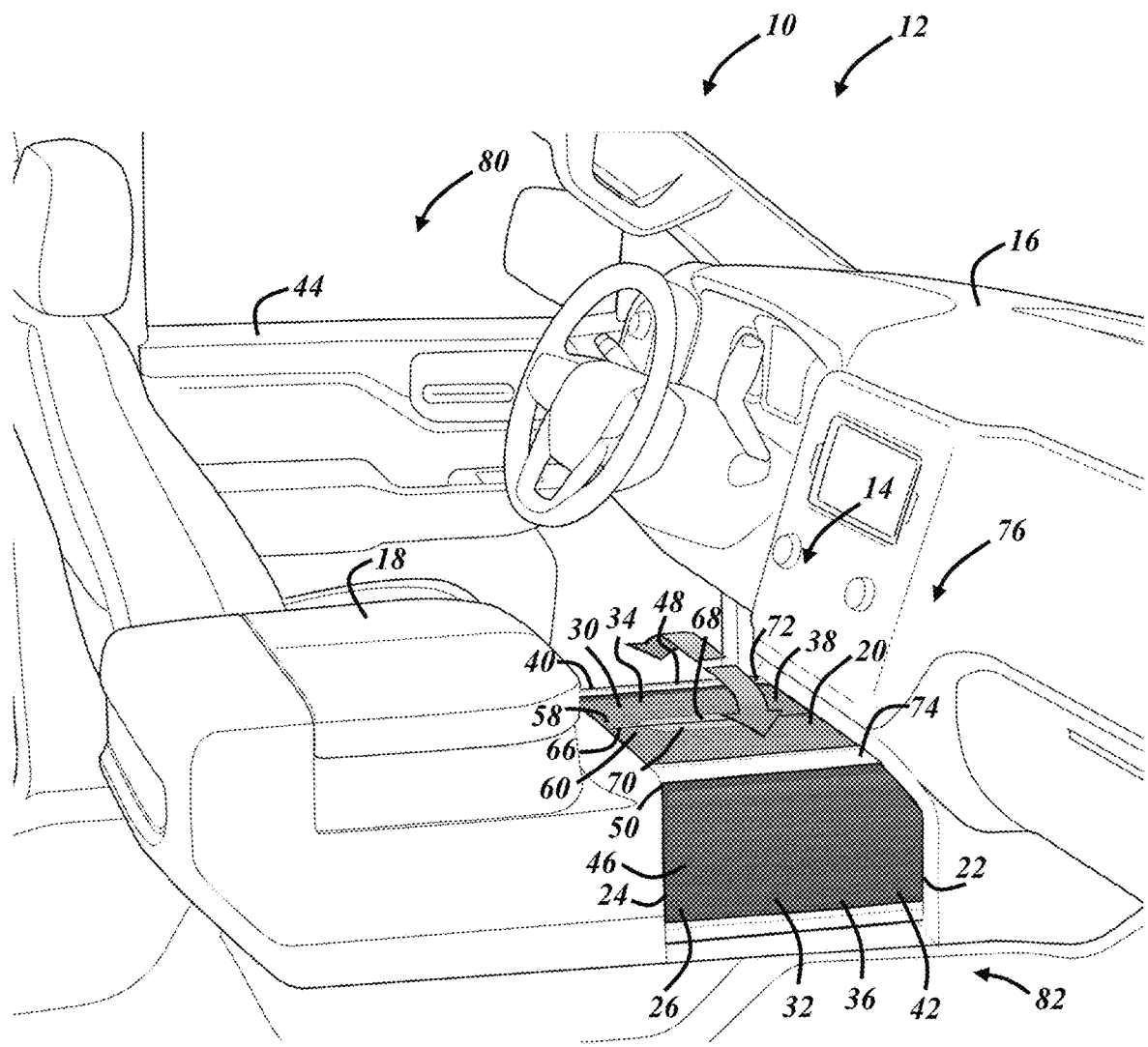
FIG. 1 is a perspective view of an example storage compartment in a closed position.

FIG. 1 is a partial perspective view of a passenger cabin 10 for a vehicle 12 having a storage compartment 14. The storage compartment 14 is advantageously located between the instrument panel 16 and the center console 18. This particular location is advantageous because it is oftentimes generally unused, and it provides a working surface 20 for either the driver or a passenger in the front. More particularly, the storage compartment 14 is integrally built between the instrument panel 16 and the center console 18 such that both the instrument panel and the center console form opposite walls or sides 22, 24 of the storage compartment. However, it is possible for the storage compartment 14 to be located in other locations in the vehicle, such as between passenger seats in another row of seating, to cite one potential example. Alternatively, it is also possible to have a stand-alone storage compartment 14 that is then installed between a pre-existing instrument panel 16 and center console 18.

The storage compartment 14 includes an exterior 26 and an interior storage area 28. A majority of the exterior 26 is generally defined by a first panel 30 and a second panel 32. In a preferred embodiment, the first panel 30 is a first tambour door 34 and the second panel 32 is a second tambour door 36. Tambour doors are particularly useful in implementations in which there is limited space, and they have an articulated construction that permits the doors to bend as they move along a curved path. This arrangement can be particularly advantageous here, where the storage compartment 14 is configured to allow access to the interior storage area 28 from a first side 38, a second side 40, and a third side 42. In this embodiment, the doors 34, 36 form the sides or walls 38, 40, 42 when the storage compartment 14 is closed. However, it should be understood that, while discussed herein in terms of tambour doors 34, 36, the panels 30, 32 can take other operationally feasible configurations.

In the illustrated embodiment, the first or top side 38 of the storage compartment 14 faces the roof of the vehicle 12, the second side 40 faces the driver's door 44, and the third side 42 faces the passenger's door (not shown). The first side 38 is formed by the first and second tambour doors 34, 36 when in a closed position, and generally forms a plane that is perpendicular to the Z-axis of the vehicle 12. The second side 40 and third side 42 oppose each other, and each generally form a plane that is perpendicular to the Y-axis of the vehicle 12. This arrangement allows easy access to the interior storage area 28 from the top (i.e., the first side 38) for either a driver of the vehicle 12 or a passenger in the front seat. Further, the driver and passenger can also access the interior storage area 28 via each different second and third side 40, 42, respectively. Accordingly, the operability is enhanced as compared with typical in-vehicle storage compartments, where access to the interior storage area can only be accomplished through one side.

Figure 2:
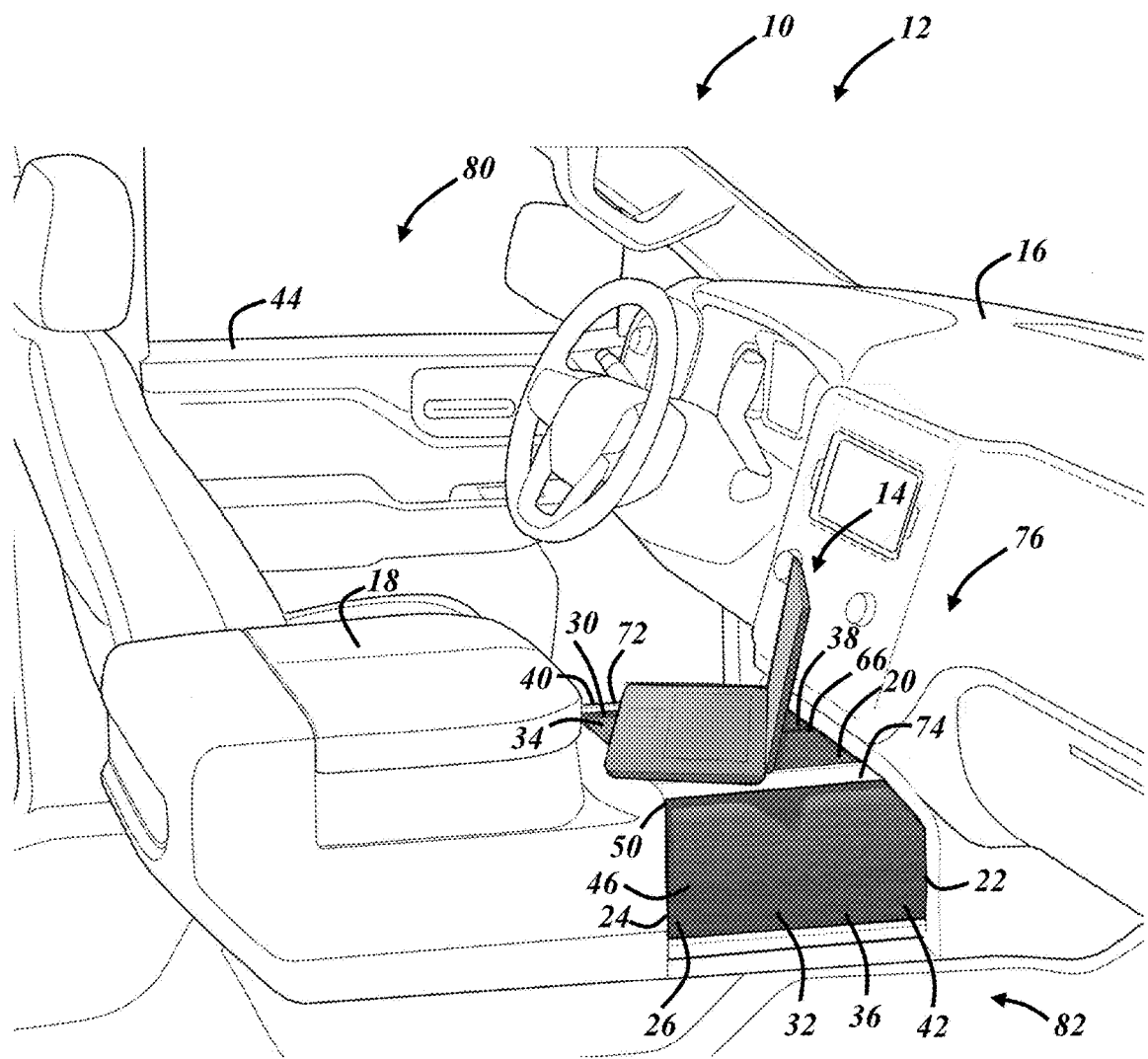
FIG. 2 is a perspective view of the storage compartment of FIG. 1, showing its use as a working surface.
Figure 4:
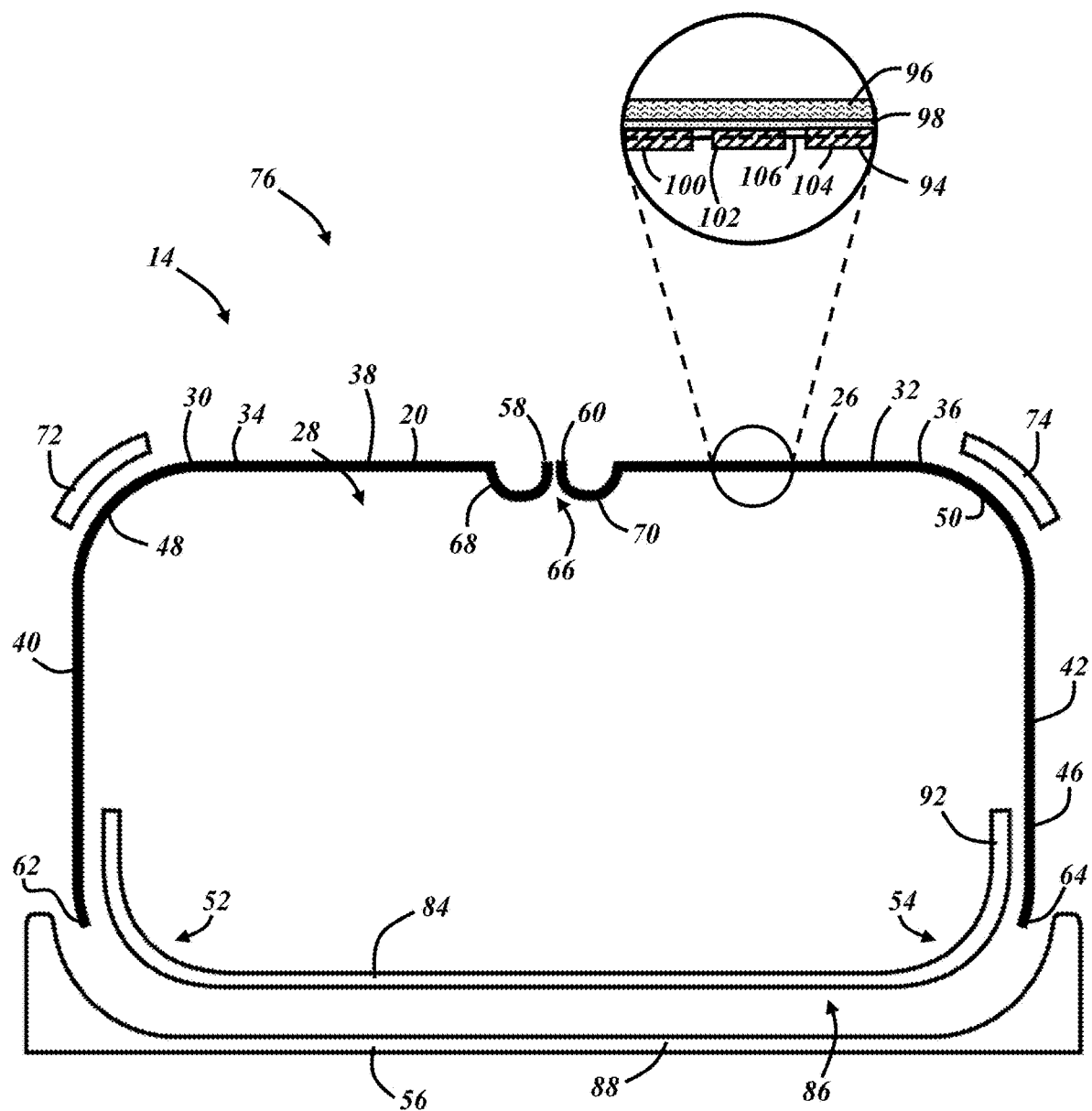
FIG. 4 is a schematic, cross-sectional view of a storage compartment in the closed position, with an enlarged schematic view of the panel structure.
Figure 5:
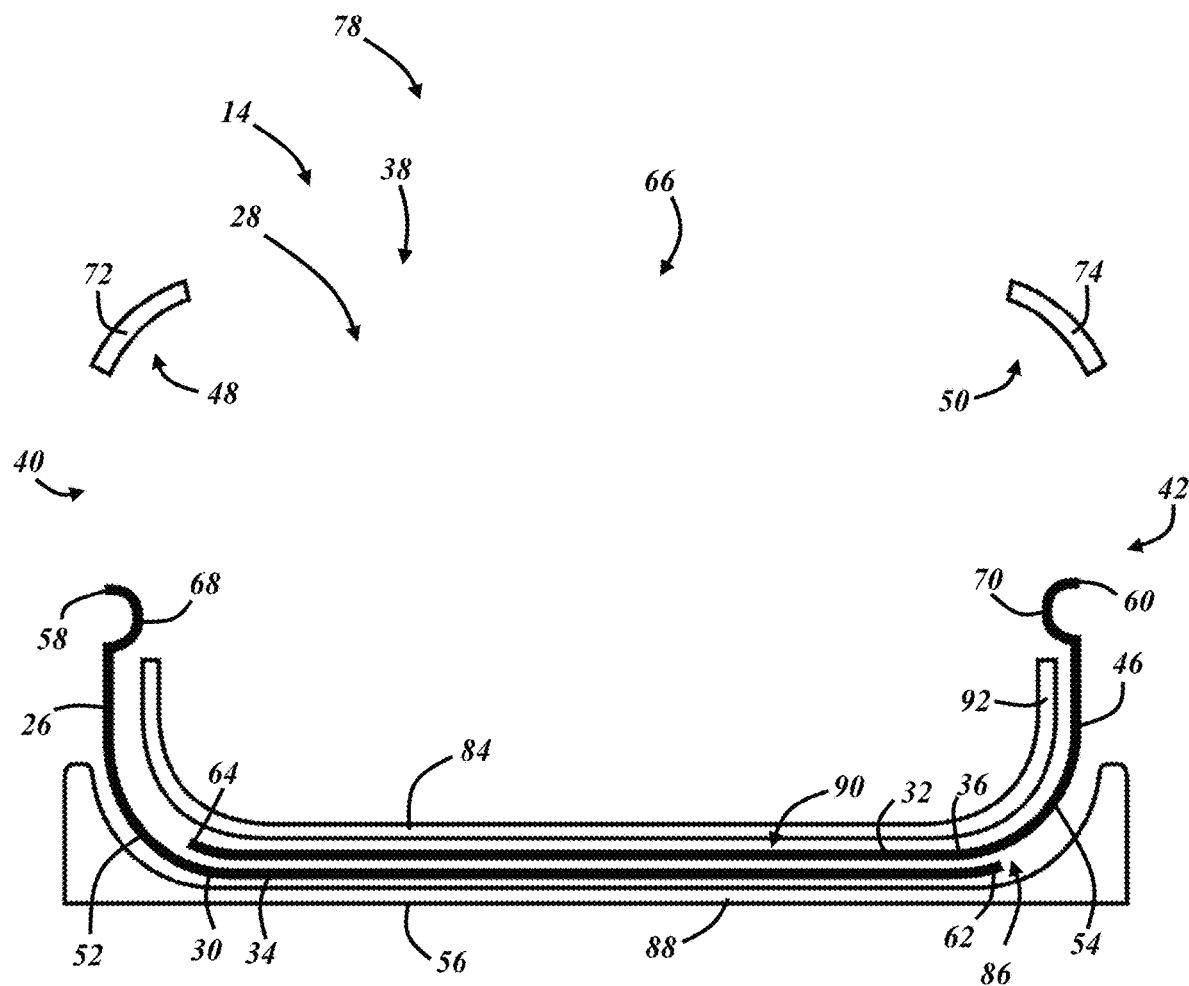
FIG. 5 is a schematic, cross-sectional view of the storage compartment of FIG. 4 in the open position.

With reference also to FIG. 4, the sides 38, 40, 42 together with a bottom side 56 of the storage compartment 14 or with the bottom side of a storage bin 84, generally form a rectangular profile 46. The rectangular profile 46 includes rounded radii 48, 50, 52, 54 at each corner, which can help with operational efficiency when using tambour doors 34, 36. With reference to FIGS. 1 and 2, the rounded radius 48 is located between the first side 38 and the second side 40, and the rounded radius 50 is located between the is located between the first side 38 and the third side 42. With reference to FIGS. 4 and 5, the rounded radius 52 is located between the second side 40 and a fourth or bottom side 56, and the rounded radius 54 is located between the third side 42 and the fourth side 56. Having all rounded radii 48, 50, 52, 54 allows for easier articulation of the tambour doors 34, 36. Further, in this embodiment, each of the sides 38, 40, 42, 56 are generally planar and angled with respect to adjoining sides, with the rounded radii located between each respective side. Other embodiments may have one or more sides that have a more curved profile, or the angles between the sides may be different than what is particularly illustrated.

Figure 3:
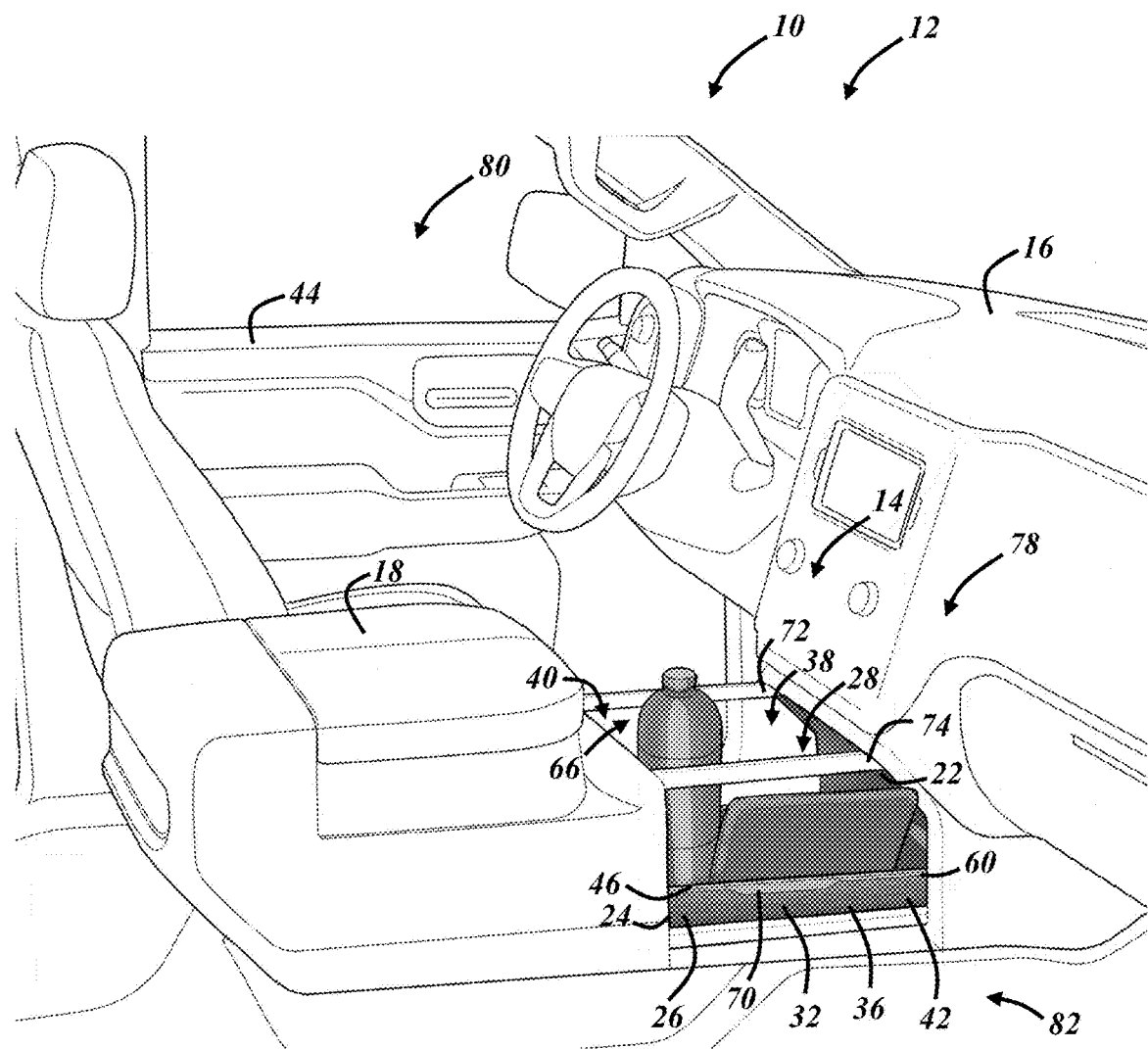
FIG. 3 is a perspective view of the storage compartment of FIGS. 1 and 2 in an open position.

The rectangular profile 46 is also a strategically efficient use of space between the instrument panel 16 and the center console 18. As shown in FIGS. 1-3 the instrument panel 16 and the center console 18 provide structure to the storage compartment 14, providing for a more integrated look and feel. However, it should be understood that the storage compartment 14 may have other shapes, side numbers, side configurations, etc. depending on the desired implementation. For example, in some embodiments, the storage compartment 14 could be built into another area of the vehicle 12. The storage compartment 14 could be located on the back of the center console 18, in an armrest in the rear of the vehicle 12, or in another operable location.

With particular reference to FIGS. 4 and 5, each first and second door 34, 36 has an access end 58, 60, respectively. Opposite the access ends 58, 60, each first and second door 34, 36 has a recessed end 62, 64, respectively. The access end 58 of the first door 34 meets the access end 60 of the second door 36 to form an opening 66. The opening 66 advantageously biases the first side 38, which can provide easier access for either a driver or a passenger. The opening 66 may include a seal, some type of closure mechanism or lock (e.g., magnets to help maintain the joining of the access ends 58, 60), or any other feature to help enhance protection of the interior storage area 28. Additionally, a number of features can be included to enhance ease of access into the interior storage area 28. The illustrated embodiment includes, for example, recessed handles 68, 70. Other handle arrangements (or no handles at all) may be included, but recessed handles 68, 70 provide for better articulation in the example embodiment, which includes reinforcement straps 72, 74 arranged outside of the interior storage area 28. Accordingly, during translation of each door 34, 36 from the closed position 76 (FIG. 4) to the open position 78 (FIG. 5), the recessed handle 68, 70 can easily pass beneath each reinforcement strap 72, 74. The recessed handles 68, 70 may provide for manual articulation of each door 34, 36, or in some embodiments, door movement may be motorized or otherwise assisted.

The access ends 58, 60 come together to form the working surface 20 on the first or top side 38 of the storage compartment 14. With reference to FIG. 2, in the illustrated embodiments, the working surface 20 is large enough to comfortably hold a user's laptop (e.g., 20 inch×20 inch). Accordingly, in at least some embodiments, the working surface 20 provides another raised, table-top-like surface for use from either the driver's side seating area 80 or the passenger's side seating area 82. The working surface 20 is available when the storage compartment 14 is in the closed position 76. However, when the storage compartment 14 is in the open position 78 (see e.g., FIG. 5), the working surface 20 on the first or top side 38 is gone, in order to provide access to an interior storage bin 84 in the interior storage area 28. In other embodiments, the working surface 20 may not be as big as what is illustrated in the figures, and it may be a smaller surface located elsewhere in the cabin 10.

Each door 34, 36 includes a recessed end 62, 64 opposite the respective access end 58, 60. In this particular embodiment, the recessed ends 62, 64 are recessed with respect to the exterior 26 of the storage compartment 14 (i.e., not visible within the passenger cabin 10) when in both the closed position 76 and the open position 78. Opposing articulating edges (not shown) may connect the opposing access ends 58, 60 and recessed ends 62, 64 to form an outer perimeter of each door 34, 36. The articulating edges may include or interact with a roller system or some other mechanism to facilitate articulation of each door 34, 36 from the closed position 76 to the open position 78.

As shown in FIGS. 4 and 5, when articulating between the closed position 76 and the open position 78, the doors 34, 36 pass through each rounded radius 48, 50, 52, 54 into a door space 86 located between a lower panel 88 and the interior storage bin 84. In the open position 78 shown in FIG. 5, the recessed end 62 of the first door 34 overlaps the recessed end 64 of the second door 36 creating an overlap region 90 where the first door, the second door, and the lower panel 88 are stacked beneath the interior storage bin 84. In this embodiment, about two-thirds of the area of each door 34, 36 overlap in the overlap region 90, which accordingly translates to a larger opening 66 when in the open position 78. In some embodiments, about half or more of the area of each door 34, 36 overlap in the overlap region 90. This arrangement conveniently locates the doors or panels 30, 32 beneath the storage bin 84 and provides for access into the interior storage area 28 through each of the three sides 38, 40, 42 of the storage compartment 14. Additionally, the storage bin 84 may have a sidewall 92 that extends around the circumference of the storage bin to help retain items in the bin. This sidewall 92 partially extends up the sides 40, 42 of the storage compartment 14. The height of the sidewall 92 of the interior storage bin 84 can be controlled to help promote access through each of the sides 40, 42. In this embodiment, for example, the sidewall 92 and doors 34, 36 block about a third of the area of each side 40, 42 when in the open position 78. This allows for about two-thirds of each side 40, 42 to be open when in the open position 78. In other embodiments, this area might be about half or more, in order to allow for dual side access, in addition to access through the top. Accordingly, the interior storage bin sidewall 92 only partially blocks the sides 40, 42 to enhance accessibility of the interior storage area 28.

With reference to enlarged partial portion of FIG. 4, each door 34, 36 in this embodiment includes a substrate 94 and a decorative layer 96 disposed over and coupled with the substrate. In this example, the decorative layer 96 is coupled with the underlying substrate 94 via a bonding layer 98, such as an adhesive layer or a cushioning layer having its opposite sides bonded with the back side of the decorative layer 96 and the outer side of the substrate 94. The substrate 94 has an articulated construction while, in this example, the decorative layer 96 is non-articulated. That is to say that the decorative layer 96 is a solid layer with a uniform thickness relying on its own flexibility for movement with the underlying articulated substrate 94. The decorative layer 96 presents a decorative surface to the vehicle cabin 10 and may be made from or include any number of materials, such as leather, a polymeric simulated leather, a simulated wood or metal material, or a natural material.

In one embodiment, the decorative layer 96 includes or is a natural wood layer, such as a wood veneer, made sufficiently thin to be able to flex to follow the profile 46 and rounded radii 48, 50, 52, 54 as each door 34, 36 moves between the closed and open positions 76, 78. The decorative layer 96 may be non-segmented or non-articulated, with a uniform thickness along its entire length and width. In this manner, the tambour doors 34, 36 have a non-tambour appearance to an observer and may thus blend in with other adjacent or surrounding decorative materials of the vehicle interior cabin 10 when the doors are in the closed position 76.

In the illustrated example of FIG. 4, the substrate 94 of each tambour door 34, 36 includes a plurality of slats 100, 102, 104 and one or more cords 106. In this embodiment, the cord 106 is a unidirectional cord embedded in a plastic material of each one of the slats. The plastic material may be a rigid or semi-rigid plastic material comprising a thermoplastic material (e.g., ABS, PC/ABS, PP, nylon, polyester, etc.) and may additionally include fillers (e.g., glass fibers, mineral, etc.), impact modifiers, and/or other additives. Additionally, each recessed handle 68, 70 may be fabricated in the same plastic molding cycle as the slats 100, 102, 104.

In yet another embodiment, each door 34, 36 could have a more rigid decorative layer 96, or a single layer structure comprising a number of lamellas for the slats 100, 102, 104. If the decorative layer 96 is rigid or a rigid single or multi-layer substrate is used for the door 34, 36, for example, (e.g., it is made of aluminum, a chromed plastic, etc.), the decorative layer or substrate itself may be sliced into lamellas, as a rigid material would likely not have the requisite flexibility to accommodate traversal around the rounded radii 48, 50, 52, 54. Other configurations for the doors 34, 36 are certainly possible, such as accordion style closure, inclusion of alternate or additional layers, or other desired modifications.

Reinforcement straps 72, 74 can also be included to help delimit the top or first side 38 from the second and third sides 40, 42, and can help maintain objects within the interior storage area 28, as shown in FIG. 3. The reinforcement straps 72, 74 may be made of the same rigid or semi-rigid plastic material as used for the substrate 94 (e.g., ABS, PC/ABS, PP, nylon, polyester, etc., and may additionally include fillers, impact modifiers, and/or other additives). They may have a decorative covering, similar to the decorative layer or covering 96 used on each door 34, 36, or it could be a different decorative covering (e.g., a chromed bar or the like). In some embodiments, the reinforcement straps 72, 74 may not be included at all, or may be configured such that they are located beneath each door 34, 36 when the storage compartment 14 is in the closed position 76. In this embodiment, however, the reinforcement straps 72, 74 are visible within the passenger cabin 10 in both the closed position 76 and in the open position 78.

The reinforcement straps 72, 74 can provide resting areas and additional support, particularly for larger objects within the storage compartment 14. As illustrated in FIG. 3, the storage compartment 14 is configured so that multiple large items can extend partially within the interior storage area 28 and out of the interior storage area on different sides 38, 42. The reinforcement straps 72, 74 can help maintain positioning of larger items, such as the illustrated water bottle, within the interior storage area 28 when the storage compartment is in the open position 78. This can increase storage capacity as compared with more typical tambour door arrangements where access is only configured through one side.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A storage compartment for a passenger cabin of a vehicle, comprising:
    a plurality of walls forming an interior storage area, the plurality of walls including an exterior comprising at least a first panel and a second panel, the first panel having an access end and the second panel having an access end, wherein the exterior is defined at least partially by a first side, a second side, and a third side,
    wherein the access end of the first panel and the access end of the second panel are configured to create a working surface on the first side of the exterior when in a closed position, wherein in the closed position, the first panel at least partially defines the second side of the exterior and/or the second panel at least partially defines the third side of the exterior, and
    wherein in an open position, the first panel and/or the second panel is configured to allow access to the interior storage area from the first side of the exterior, as well as the second side and/or the third side of the exterior.

2. The storage compartment of claim 1, wherein the first panel is a first tambour door and the second panel is a second tambour door.

3. The storage compartment of claim 1, wherein the first side and the second side join at a rounded radius.

4. The storage compartment of claim 1, wherein the first side is configured to face a roof of the vehicle, and the second side configured to face a door of the vehicle.

5. The storage compartment of claim 4, wherein the third side is configured to face another door of the vehicle.

6. The storage compartment of claim 5, wherein the first panel is configured to allow access to the interior storage area from the first side and the second side, and the second panel is configured to allow access to the interior storage area from the first side and the third side.

7. The storage compartment of claim 1, wherein the first panel and the second panel are configured to be placed between a center console and an instrument panel of the vehicle, whereby one of the plurality of walls is formed by, or located at, the center console and another of the plurality of walls is formed by, or located at, instrument panel.

8. The storage compartment of claim 1, comprising a first reinforcement strap and a second reinforcement strap, wherein the first reinforcement strap and the second reinforcement strap delimit the first side.

9. The storage compartment of claim 8, wherein the first reinforcement strap and the second reinforcement strap extend between a center console and an instrument panel of the vehicle.

10. The storage compartment of claim 8, wherein the first panel and the second panel are configured to slide under the first reinforcement strap and the second reinforcement strap, respectively, such that the first reinforcement strap and the second reinforcement strap are visible in the passenger cabin when in the closed position.

11. The storage compartment of claim 1, wherein the first panel and the second panel each have a recessed handle located toward the access end.

12. The storage compartment of claim 1, wherein the first panel has a recessed end opposite the access end and the second panel has a recessed end opposite the access end.

13. The storage compartment of claim 12, wherein the recessed end of the first panel is configured to overlap the recessed end of the second panel when in the open position.

14. The storage compartment of claim 13, wherein the recessed end of the first panel and the recessed end of the second panel are configured to overlap in a door space beneath an interior storage bin when in the open position.

15. The storage compartment of 14, wherein the interior storage bin has a sidewall that partially extends up the second side and the third side, which each face a different door of the vehicle.

16. A storage compartment for a passenger cabin of a vehicle, comprising:
    a plurality of walls forming an interior storage area, the plurality of walls including an exterior comprising at least a first panel and a second panel, the first panel having an access end and the second panel having an access end, wherein the first panel has a recessed end opposite the access end and the second panel has a recessed end opposite the access end, wherein the exterior is defined at least partially by a first side, a second side, and a third side,
    wherein the access end of the first panel and the access end of the second panel are configured to create a working surface on the first side of the exterior when in a closed position, and
    wherein in an open position, the first panel and/or the second panel is configured to allow access to the interior storage area from the first side of the exterior, as well as the second side or the third side of the exterior, wherein the recessed end of the first panel is configured to overlap the recessed end of the second panel when in the open position.

* * * * *